April 22, 1941.  H. E. METCALF ET AL  2,238,980
ELECTRICAL MONITOR AND CIRCUIT
Filed Jan. 3, 1940  3 Sheets-Sheet 1

INVENTORS,
HERBERT E. METCALF.
ELLSWORTH W. CARROLL.
BY
Lippincott & Metcalf
ATTORNEYS.

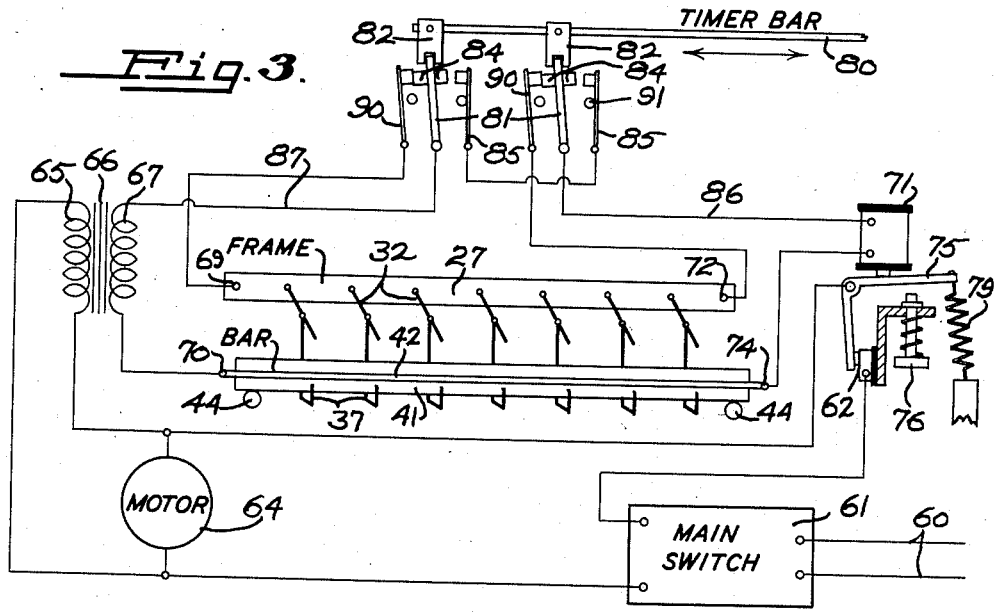
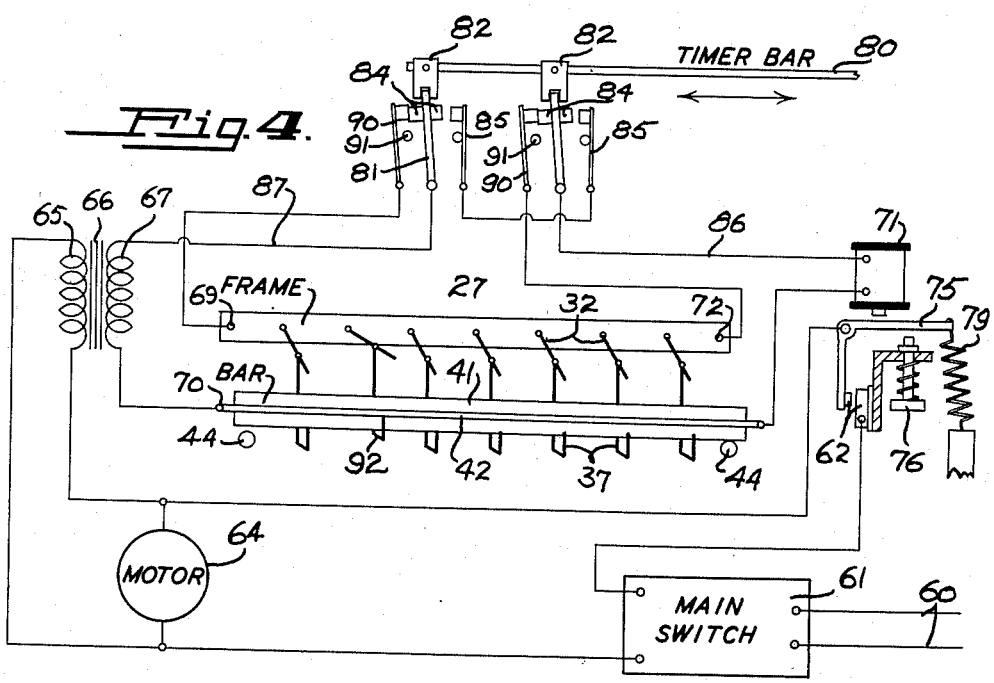

INVENTORS,
HERBERT E. METCALF.
ELLSWORTH W. CARROLL.
BY
Lippincott & Metcalf
ATTORNEYS.

Patented Apr. 22, 1941

2,238,980

UNITED STATES PATENT OFFICE 2,238,980

ELECTRICAL MONITOR AND CIRCUIT

Herbert E. Metcalf and Ellsworth W. Carroll, San Francisco, Calif., assignors to S & W Fine Foods, Inc., San Francisco, Calif., a corporation of California Application January 3, 1940, Serial No. 312,189

5 Claims. (Cl. 192—125)

Our invention relates to electrical monitors, and more particularly to a monitor and circuit which will indicate the failure of proper and uniform motion of one or a plurality of parts. As an example of the practical use of our invention, it will be described in conjunction with the monitoring of a plurality of sorting members operating to sort improperly pitted from properly pitted fruit during the operation of an automatic cherry pitting machine, such as has been described and claimed in the prior application of Ellsworth W. Carroll for United States Letters Patent entitled "Means for inspecting fruit for pits, Serial No. 292,431, filed August 29, 1939.

Among the objects of our invention are: To indicate the failure of any one of one or a plurality of movable elements to follow their proper path; to indicate sticking or failure of a single element or any one of a plurality of cyclically movable elements; to provide a monitor for a plurality of cyclically movable elements that will automatically indicate undesired positions of the elements and simultaneously indicate any failure of the monitoring circuit itself; to provide, in a pitting machine, a monitor for a plurality of pit inspection devices; to provide a means, in an automatic pitting machine, to monitor the action of one or more sorting devices, thus preventing improper sorting or failure of any one of the devices; to provide a means of preventing improperly pitted fruit, in an automatic pitting machine, from reaching the useful output of the device; and to provide a simple, efficient and positive electrical monitor for one or a plurality of movable members.

Other objects of our invention will be apparent or will be specifically pointed out in the description forming a part of this specification, but we do not limit ourselves to the embodiment of the invention herein described, as various forms may be adopted within the scope of the claims.

In automatic pitting machines such as those that are adapted to handle at high speed fruits such as cherries, and to pit a relatively large number of cherries simultaneously, it is highly desirable to inspect the result of the pitting operation to determine whether or not cherries which have been subjected to the pitting operation still have pits remaining in them. In the prior application of Ellsworth W. Carroll cited above, he has described one form of sorting mechanism, highly efficient for the inspection of pitted fruit, wherein a pit extracted from the fruit is utilized to operate a sorting arm, thereby passing the fruit from which the pit came, to the useful output of the device. If no pit has been extracted from the fruit, then the sorting mechanism does not operate, and consequently the fruit is passed to a discharge chute separate from the chute used for the properly pitted cherries.

In any such sorting devices, irrespective of how they are constructed, if they use the pit to control the sorting movement, it is necessary, for efficient operation of the device, that the sorting mechanism be freely movable without binding, in order that the power necessary to move the device does not smash or break the pit. Furthermore, in such devices it is common to utilize counterweights or springs to cause the return of the sorting mechanism to its resting position, and if such a device does not, for any reason, return to resting position, then it is obvious that improper sorting may take place.

Our invention is directed to the indication of any improper condition of the sorting devices which would prevent the device from being moved to proper sorting position or which would prevent the device from returning to proper resting position. As long as the device is freely and properly operating, the monitor system of our invention does not hinder the operation thereof. When, however, for any reason whatsoever, due to binding, jamming of fruit meat or pits in any part of the sorting mechanism, bending of the parts of the sorting device itself, sluggish movement or slow response, the monitor of our invention will immediately indicate such a change in the operation of the device and will, in its preferred form, stop the machine to prevent improper sorting and to enable the operator to fix the particular sorting device which is causing trouble.

Our invention may be more easily understood by reference to the drawings, wherein:

Fig. 3 is a diagrammatic circuit and mechanical view, showing the condition of the monitor when all of the sorting members have properly returned to their resting position.

Fig. 4 is a diagram similar to Fig. 3, showing the action of the device when one of a plurality of sorting arms is stuck or bound.

Figure 1:
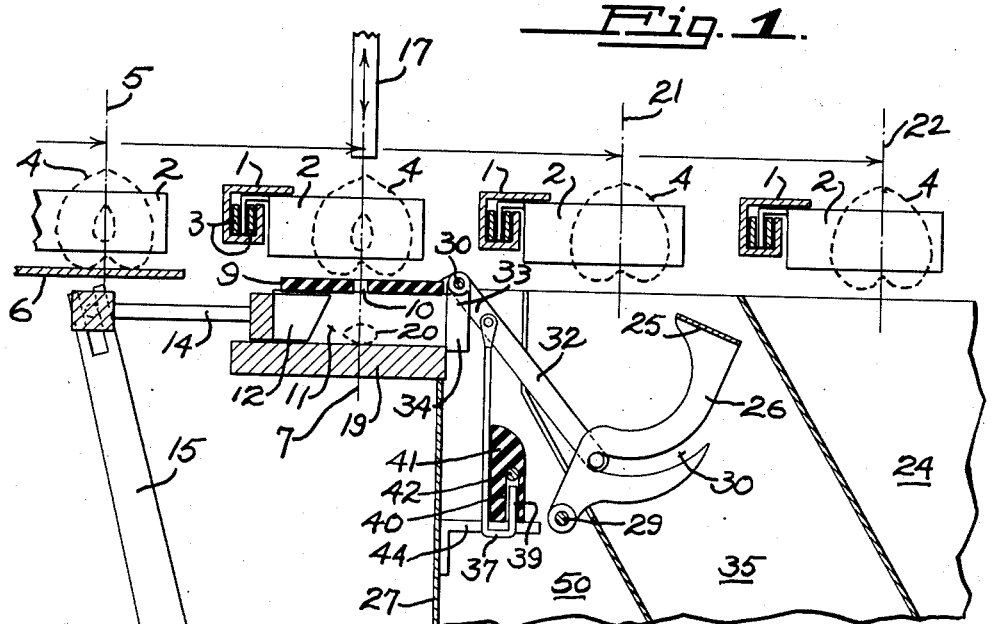
Fig. 1 is a diagrammatic side view partly in section and partly in elevation, of one form of our monitoring system as applied to a sorting mechanism following the pitting operation on cherries in an automatic machine.
Figure 2:
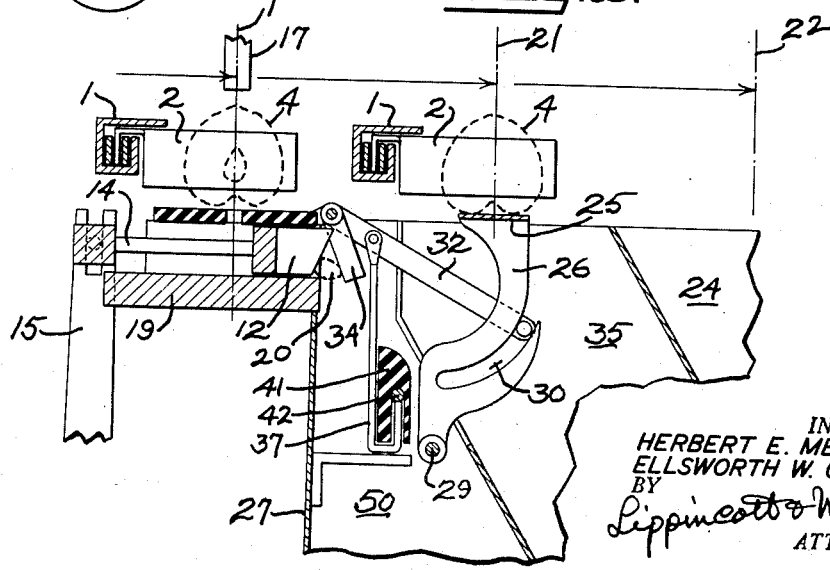
Fig. 2 is a similar view, showing the next step in the sequence of operation, following that shown in Fig. 1.

Referring directly to Fig. 1 for a more detailed description of the monitor as applied to an automatic cherry pitting machine, a plurality of transverse carrier bars 1 are connected with a conveying system, not shown, so that the bars are intermittently progressed to various stages in sequence. Each bar carries, projecting ahead of it, one or more pairs of clamp arms 2, each pair being adapted to be opened and closed by operating bars 3 inside carrier bars 1, thus gripping or releasing the fruit in accordance with the desired sequential operation of the machine. The bars 1 are progressed through the various stages of the device, so that any fruit, such as a cherry 4 clamped between arms 2, stops at the various stages with its vertical axis in proper position.

In Fig. 1, for example, the extreme left hand stage, indicated by broken line 5, is a loading stage. Here, the clamps are opened, and the cherries deposited therein, preferably with their stem indent down, on a loading plate 6. The clamps are then closed, and the next movement of the conveyor carries the cherry to a pitting stage indicated by broken line 7, and in this pitting stage the clamp arms stay closed to grip the cherry which is now resting over a rubber pitting plate 9 having a central aperture 10 therein. Immediately below central aperture 10 is a pit cavity 11 through which reciprocates a pit piston 12 operated by rod 14 engaging the end of a crank arm 15 operated by a cam 16.

Immediately above the cherry is positioned a pitting knife 17 which, when moved downwardly, passes through the cherry, pushes the pit of the cherry through aperture 10, and deposits the pit into chamber 11, to rest on the bottom plate 19 thereof. This pit is indicated by the broken line 20. After the cherry has been subjected to the pitting operation it is moved to the next stage, a sorting stage as indicated by line 21, and then after sorting has taken place the next movement takes the cherry, if it has not been eliminated by sorting, to an output stage 22 where the clamp arms are opened to drop the cherry into useful output chute 24.

The sorting of the fruit is accomplished by the use of a sorting bar 25 which is mounted on arms 26 pivoted to the frame 27 by pivot 29. One arm 26 is provided with an arcuate slot 30 in which a roller 31 operates, this roller 31 being on the end of one arm 32 of a bell crank 33, the other arm 34 of this bell crank closing the end of pit chamber 11. The resting position of sorting bar 25 is such that it is to one side of the vertical axis of any fruit in sorting station 21. The sorting mechanism is surrounded by improperly pitted fruit output chute 35.

Downwardly depending from arm 32 adjacent bell crank pivot 36 is a hook 37 having an upturned end 39, this upturned end entering a slot 40 in a contact bar 41 of insulating material, the upper end of the slot being provided with a transverse conductor 42. When a plurality of alined sorting mechanisms are utilized only a single contact bar is needed for all of the sorting mechanisms, the hook ends 39 of the individual sorting mechanisms entering slot 40. When sorting bar 25 is in normal resting position at one side of the fruit in the sorting position, contact bar 41 is supported on studs 44, and in this position the upturned ends 39 of the hooks do not touch transverse conductor 42. Thus, we have described the device shown in Fig. 1, as having a single sorting mechanism in resting position; the pit has been deposited in the pit receiving recess 11, and the fruit from which that pit came has been moved to station 21, ready for sorting.

The next step in the operation of the device is a movement of arm 15 pushing pit piston 12 through pit receiving recess 11, thus pushing the pit ahead of it. The pit then makes contact with bell crank arm 34 which swings bell crank arm 32 upwardly, moving roller 31 in arcuate slot 30 of the sorting mechanism. This swings the sorting bar 25 to a position immediately below the fruit 4 which has been subjected to the pitting operation, and the clamp arms are then opened. Fruit 4, however, is fully supported between arms 2 by sorting bar 25 and remains in place so that when clamp arms 2 close again they close upon the fruit, the next movement of the conveyor taking that fruit to the properly pitted output chute 24. As arm 32 rises, however, hook 37 also rises and hook end 39 makes contact with the transverse conductor 42 inside the sorting bar, and the sorting bar is thereby lifted away from studs 44.

The final motion of pit piston 12 discharges the pit 20 into pit chute 50, and withdrawal of pit piston 12 to its resting position then allows the full weight of the sorting bar, acting as a counterweight, to come upon arm 32, thus tending to urge the arm 32 to its original resting position and thereby returning sorter bar 25 to its resting position. As the sorting mechanism returns to resting position the weight of the contact bar 41 is again transferred to the studs 44 and if the sorting mechanism does not bind and is perfectly free to move, the weight of arm 32 and the weight of arm 26, due to the angular position thereof, will cause the sorting mechanism to travel the remainder of the distance to its final resting position.

When a plurality of alined sorting mechanisms are used there may of course be sorting bars in the group that are not moved, because no pit has been delivered from the fruit. In this case those sorting mechanisms that do operate due to pits being properly removed, will lift the contact bar.

If, however, there has been any binding of the parts of any one of the sorting mechanisms, so that any of the sorting bars 25 do not return freely to the resting position, contact bar 41 will remain supported by hook 37 of the bound sorting mechanism. It occasionally happens that such binding will hold the sorter bar 25 immediately beneath sorting station 21, and if this occurs then it will be obvious that continued operation of the machine may pass fruit which has not been properly pitted into the useful output of the device. We have therefore provided an electrical monitor operating in conjunction with the single counterweight which will indicate when any one of the sorting mechanisms has hung up, and which will, at the same time, automatically monitor the monitor circuit itself, as well as broken connections and power failure. This indication is preferably a shutdown of the machine.

Figure 5:
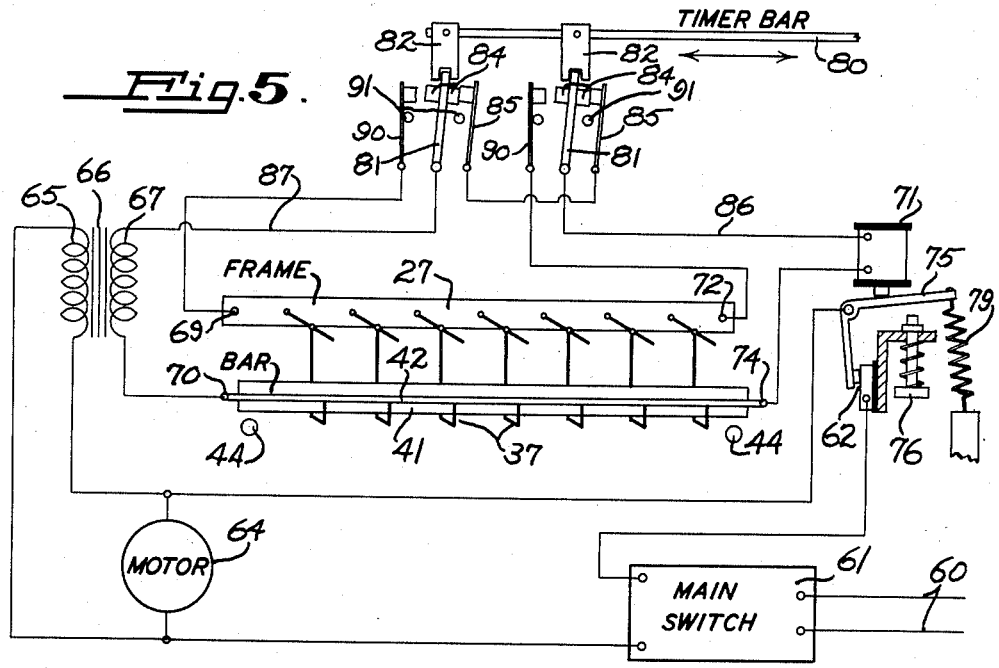
Fig. 5 is a view similar to Figs. 3 and 4, showing the operation of the timer bar.
Figure 6:
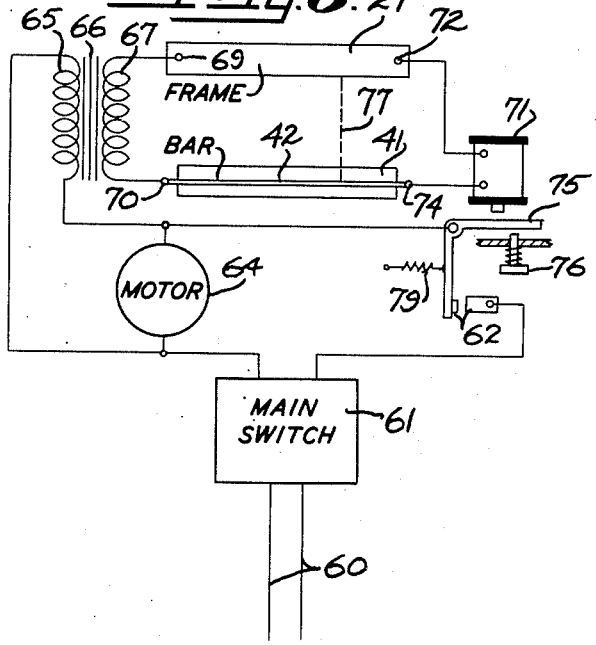
Fig. 6 is a simplified circuit diagram of a monitor circuit following our invention.

This monitor circuit is shown in Figs. 3 to 6 inclusive, as adapted to a cherry pitting machine. The simplest form is shown in Fig. 6. Here, power mains 60 pass through a main switch 61 and through relay contacts 62 to the main motor 64 operating the machine. Connected in parallel with motor 64 is the primary 65 of a step-down transformer 66, the secondary 67 of which is applied at one side thereof with a connection 69 to the frame of the machine, the other side of the secondary having a connection 70 with transverse conductor 42 in bar 41. Relay coil 71 is connected to frame 27 with a frame connection 72 and with conductor 42 by a conductor connection 74. Thus, it will be seen that the secondary of transformer 66 is connected to the frame and to the conductor 42 with connections that are entirely separate from the connection therewith of relay coil 71. The reason for this will be explained later. Relay coil 71 attracts a relay armature 75 to close contacts 62. A reset button 76 is provided to reset the relay after opening, and close the motor and transformer circuits.

Examining the simplified diagram shown in Fig. 6, it will be seen that any short between frame 27 and transverse conductor 42, as indicated by line 77, will short out relay coil 71 from secondary 67, thus de-energizing relay coil 71 and allowing relay spring 79 to open contacts 62. The opening of contacts 62 will de-energize motor 64 and will also de-energize primary 65 of transformer 66, thus stopping the machine and removing current from the transformer 66 so that it will not be harmed by the short. Step-down transformers of a type easily available are not harmed by momentary shorting.

Applying this basic circuit to a cherry pitting machine such as has been above described, having a plurality of sorting mechanisms which are diagrammatically indicated in Figs. 3, 4 and 5 by heavy lines, it will be seen that in view of the fact that the bar 41 is lifted during each cycle of operation of the sorting mechanism by contact of the hook ends 39 with the central conductor 42, that it is desirable to place a timer on the device so that while the bar is normally being lifted by the sorting mechanisms that the short thereby obtained does not operate to stop the machine. We accomplish this timing by utilizing a timer bar 80 operated in synchronism with pit piston 12 to operate the central arms 81 of two switches through links. Central arms 81 have central connected contacts 84, the right hand contacts 85 of each switch being connected together. One of the central contacts 84 connects through wire 86 to one end of relay coil 71. The other central contact connects through wire 87 to one end of transformer secondary 67. Right hand contacts 90 of each switch are separately connected to the frame.

The timer bar is so connected with the operation of the machine that when all sorting mechanisms are properly in their resting positions, with their hook ends 39 thus clearing conductor 42 on bar 41, secondary 67 of transformer 66 is connected to the frame, as shown in Fig. 3, whereas when the sorting mechanisms are being operated to raise bar 41 the timer bar is moved to the right to connect the secondary 67 of transformer 66 directly to the relay coil without including the frame. This occurs because contacts 85 and 90 are made resilient and remain in connection with central contacts 84 until the new contact has been established. The resilient contacts 85 and 90 are prevented from following the central contacts 84 by stops 91. Thus, the frame is only energized during the time when all of the sorting mechanisms are supposed to be in their proper resting position, but the action of the timer bar and coordinated switches prevents any interruption of current through the relay coil during the time that the frame is de-energized so that no indication occurs and the circuit remains established.

If, however, after the majority of the sorting devices have returned to their resting position and the timer bar is operated to energize the frame as shown in Fig. 4, one or more of the sorting mechanisms have become stuck and do not return to their resting position properly, then the weight of the sorting bar will rest on hook end 39 of the stuck mechanism, indicated by numeral 92 in Fig. 4, during the time both frame and bar are energized. In this case the short operates to de-energize the relay and open the main power circuit, thus stopping the machine entirely, whereupon the operator of the machine can investigate, find which one of the sorting mechanisms has hung up, remedy the difficulty, and start the machine again by pushing the starter button 76.

While we have described above the energization of the frame by the timing switches, it will be quite obvious to those skilled in the art that it is just as easily possible to energize and de-energize the conductor 42. The only advantage in utilizing the frame is that the switches are usually mounted on the frame, and thus connections thereto can be easily made with a minimum of wiring.

It will be noticed above that we have emphasized the fact that the secondary 67 of transformer 66 is preferably connected to the frame and conductor with connections separate from the frame and conductor connections of relay coil 71. Obviously, such separate connections are not at all necessary for the operation of the device as a monitor of the sorting mechanisms. Such separate connections are, however, highly desirable in order that the circuit itself may be monitored. Bar 41 is constantly moving, and it might well be that one or the other of the connections to conductor 42 might break off. With only a single connection to the conductor the connection of relay coil 71 to secondary 67 might still be intact, and yet the conductor 42 not be energized when it should be. With four separate connections, however, if any one of them are broken off the relay circuit is opened and the relay acts, shutting down the machine.

It will therefore be seen that with the circuit as above described, all connections are monitored. Furthermore, imperfect contacts in the timing switches are also monitored. The circuit has complete closed circuit operation at all times so that any opening of the circuit, due to the breakage of any connection, will shut down the machine and at the proper time the circuit is operable to shut down the machine if any short occurs across secondary 67 and relay coil 71.

While we have described certain particular constructions of sorting mechanisms, and certain means to operate the sorting mechanisms, it will be obvious to all those skilled in the art that the monitor circuit as above described can be applied not only to various modifications of sorting mechanisms, trap doors, or other fruit diverting mechanisms, but that the monitoring circuit as disclosed herein can be applied to any unit or alined series of movable parts which are cyclically moved and normally returned to predetermined resting positions. The circuit of our invention as described herein, may of course then be utilized to determine whether or not such movable members have actually returned to their normal resting positions at the period of the cycle when they are supposed to be in such positions.

It will also be noticed that we have shown conductor 42 as being inside bar 41 and operated by an upturned portion 38 of the hooks. This construction is not necessary for the proper operation of our invention, as, of course, the shorting contact could take place between the bottom of the bar and the horizontal portion of the hook. Certain fruits, however, such as cherries, are usually handled in brine, which is a mixture of sulphur dioxide and lime, such brine having very definite current carrying properties. Any accumulation of such brine between the hooks and conductor 42 would, of course, tend to short the conductor to the frame. In the present modification, therefore, we prefer to raise the conductor 42 in such a manner that any brine dripping on bar 41 cannot approach the actual electrical contact surfaces.

Figure 7:
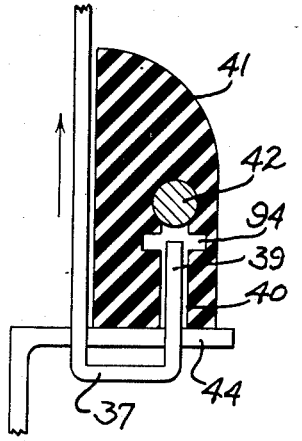
Fig. 7 is a view partly in section and partly in elevation, of a modification of the movable contact bar.

In Fig. 7 we have shown a slight modification of the contact bar where a T-slot 94 is provided therein to prevent any pumping or gradual seepage of brine onto the contact areas. The T-slot 94 prevents fluid from passing by capillarity to the contact surfaces, and in case of very wet operation of the machine, aids materially in preventing shorting by an accumulation of conductive liquids. It will be obvious, however, that with dry operation of the machine such precautions as raising the conductor in a slot will not be necessary.

We claim:

1. In a fruit pitting machine having a frame carrying a plurality of pivoted inspection members moved by the presence of a pit after a pitting operation to select the fruit from which said pit was expelled, said members being returnable to alined resting positions by gravity, a downwardly depending arm attached to each of said members and movable therewith, a single movable counterweight extending across and supported by said arms when in fruit selecting positions, said counterweight being a conductor insulated from said frame, the supporting contact of said arms therewith being with said conductor, stop means positioned to support said counterweight in a position short of the final resting position of said arms thereby disconnecting all of said arms from said conductor when said arms properly return to resting position, and electrical circuits indicating any contact of arm and conductor after said members and arms should have reached resting position.

2. In a fruit pitting machine having a frame carrying a plurality of pivoted inspection members moved by the presence of a pit after a pitting operation to select the fruit from which said pit was expelled, said members being returnable to alined resting positions by gravity, a downwardly depending arm attached to each of said members and movable therewith, a single movable counterweight extending across and supported by said arms when in fruit selecting positions, stop means positioned to support said counterweight in a position short of the final resting position of said arms thereby disconnecting all of said arms from said counterweight when said arms properly return to resting position, electrical contacts operable in accordance with the position of said counterweight with respect to said stop means, and electrical circuits controlled by the condition of said contacts indicating support of said counterweight by any of said arms after said arms should have reached resting position.

3. In a fruit pitting machine having a frame carrying a plurality of pivoted inspection members moved by the presence of a pit after a pitting operation to select the fruit from which said pit was expelled, said members being returnable to alined resting positions by gravity, a downwardly depending arm attached to each of said members and movable therewith, a single movable counterweight extending across and supported by said arms when in fruit selecting positions, stop means positioned to support said counterweight in a position short of the final resting position of said arms thereby disconnecting all of said arms from said counterweight when said arms properly return to resting position, means for driving said machine, control means for said driving means, and circuits controlled by the condition of said contacts for operating said control means when said counterweight is supported by anyone of said arms away from either of said stop means after all of said arms should have reached resting position.

4. In a fruit pitting machine having a frame carrying a plurality of pivoted inspection members moved by the presence of a pit after a pitting operation to select the fruit from which said pit was expelled, said members being returnable to alined resting positions by gravity, a downwardly depending arm attached to each of said members and movable therewith, a single movable counterweight extending across and supported by said arms when in fruit selecting positions, stop means positioned to support said counterweight in a position short of the final resting position of said arms thereby disconnecting all of said arms from said counterweight when said arms properly return to resting position, means for driving said machine, control means for said driving means, circuits controlled by the condition of said contacts for operating said control means when said counterweight is supported by any one of said arms away from either of said stop means after all of said arms should have reached resting position, and means for energizing said contacts only when all of said arms should be in resting position.

5. In a fruit pitting machine having a frame carrying a plurality of pivoted inspection members moved by the presence of a pit after a pitting operation to select the fruit from which said pit was expelled, said members being returnable to alined resting positions by gravity, a downwardly depending arm attached to each of said members and movable therewith, a single movable counterweight extending across and supported by said arms when in fruit selecting positions, stop means positioned to support said counterweight in a position short of the final resting position of said arms thereby disconnecting all of said arms from said counterweight when said arms properly return to resting position, means for driving said machine, control means for said driving means, circuits controlled by the condition of said contacts for operating said control means when said counterweight is supported by any one of said arms away from either of said stop means after all of said arms should have reached resting position, and a switch operating in synchronism with said machine for energizing said contacts only when all of said arms should be in resting position.

HERBERT E. METCALF.
ELLSWORTH W. CARROLL.